Nov. 14, 1967   J. A. MARR   3,352,952
METHOD OF COLORING THERMOPLASTICS
Filed June 22, 1964   2 Sheets-Sheet 1

INVENTOR
JOHN A. MARR
BY *James H. Parker.*
HIS ATTORNEY

Nov. 14, 1967  J. A. MARR  3,352,952
METHOD OF COLORING THERMOPLASTICS
Filed June 22, 1964  2 Sheets-Sheet 2

INVENTOR
JOHN A. MARR
BY *James A. Parker*
HIS ATTORNEY

United States Patent Office 3,352,952
Patented Nov. 14, 1967

3,352,952
METHOD OF COLORING THERMOPLASTICS
John A. Marr, Meriden, Conn., assignor to Shell Oil Company, New York, N.Y., a corporation of Delaware
Filed June 22, 1964, Ser. No. 376,809
3 Claims. (Cl. 264—40)

ABSTRACT OF THE DISCLOSURE

A method of measuring and transferring a master batch composition into a sealed devolatilizing extruder is disclosed. This method comprises passing a masterbatch composition from an atmospheric zone along an elongated conduit which has positioned therein a specially adapted ball valve, passing a measured position of the composition through the valve into the devolatilizing section of a sealed extruder.

This invention relates to a method of measuring and transferring solid materials into a sealed system. The invention is particularly applicable to continuous on-stream techniques wherein a masterbatch composition is measured and transferred into the devolatilizing extruder of a continuous polymerization process for thermoplastic polymers, such as polystyrene.

In many instances, it is necessary to introduce a material into a closed process system wherein it is desirable not to expose the system to the surrounding atmosphere, such as, for example, during the devolatilizing and extrusion steps in a thermoplastic polymerization process. Devolatilization as used herein is differentiated from extrusion. Devolatilization is conducted in the devolatilizing extruder and is an integral part of the polymerization process, whereas the final product is sometimes re-extruded, either for coloring or other reprocessing after polymerization. The devolatilization step is accomplished by subjecting the polymer in the devolatilizing extruder to pressures in the range of 10–300 mm. Hg absolute. It is essential that this portion of the process system be tightly sealed from the surrounding atmosphere to adequately reduce the pressure to the desired level. Also, contact between the surrounding atmosphere and the polymer during extrusion would contaminate the polymer and result in an inferior and undesirable product having discoloration, surface blemishes, porosity or roughness.

It is an object of this invention, therefore, to provide a simple and economical method for introducing a measured amount of a material into a sealed system. It is a specific object to provide a suitable method of introducing masterbatch composition into a sealed devolatilizing extruder. It is a further object of this invention to provide a integral system for continuous polymerization and coloring of thermoplastic polymers.

Figure 1:
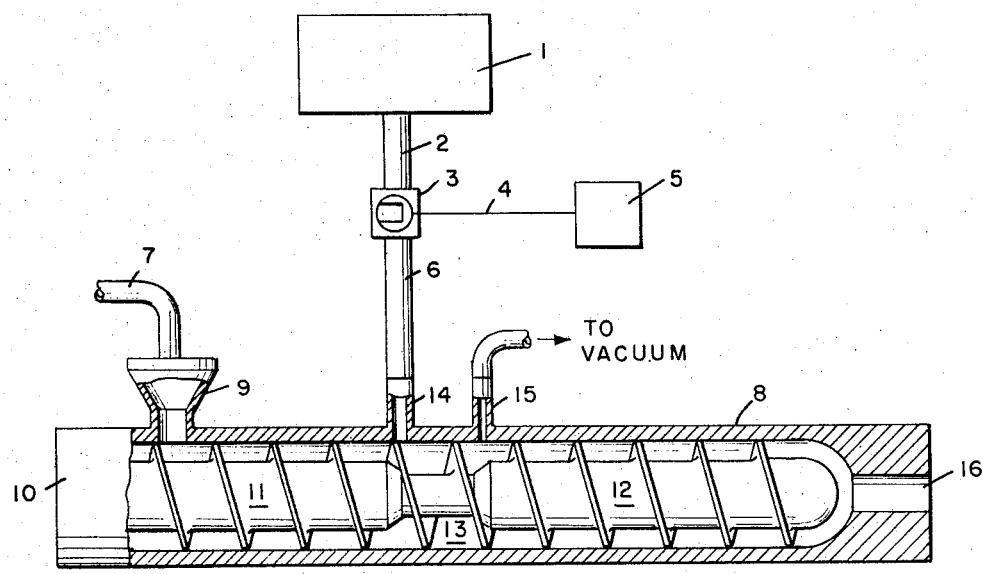
Figure 2:
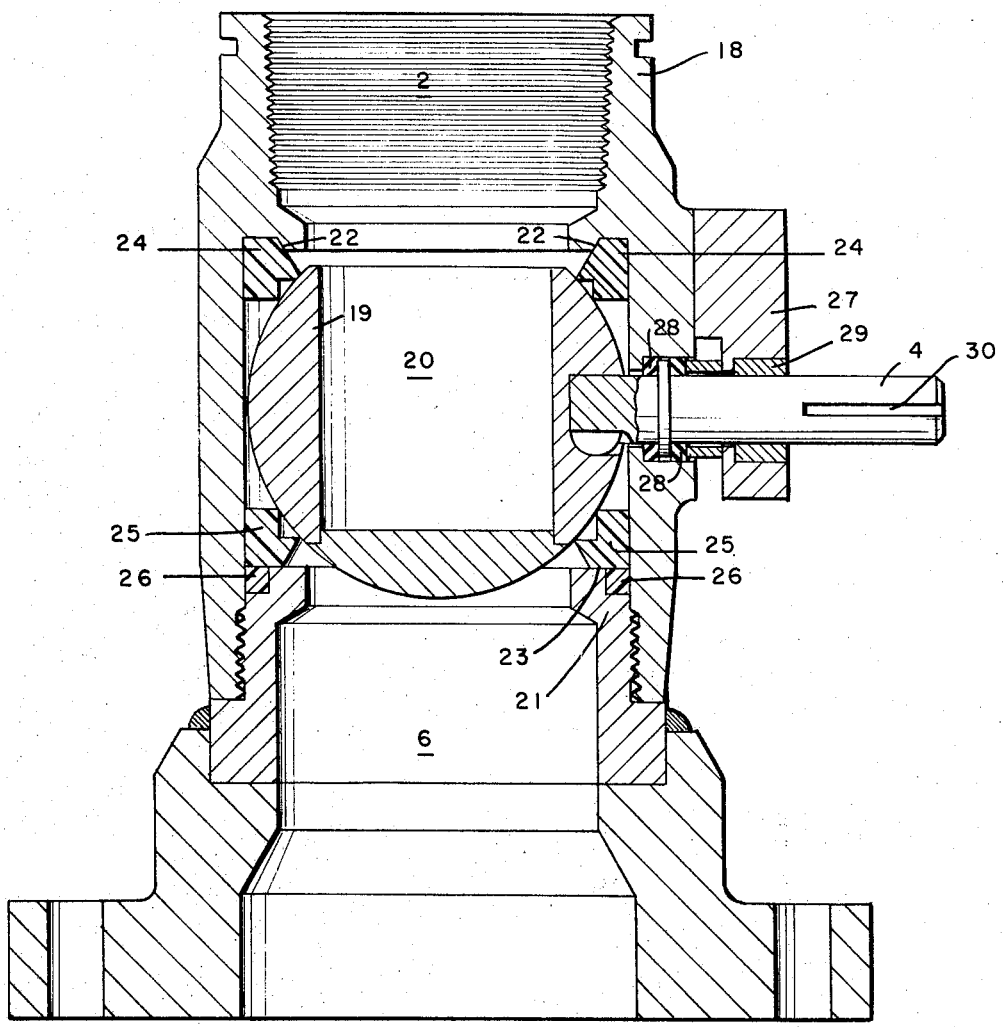

The invention will be apparent from the detailed description hereinafter and the attached drawing wherein
FIGURE 1 is a schematic flow diagram illustrating the flow of the masterbatch composition and thermoplastic polymer into the extruder. FIGURE 1 further shows schematic detail of the devolatilizing extruder.
FIGURE 2 is a detailed drawing of a valve suitable for carrying out the process of this invention.
FIGURES 3 to 6 illustrate the positions of the valve with respect to the flow of masterbatch, the sealed system, and the surrounding atmosphere as the ball member of the valve engages in one complete rotation.

As used herein, the term "single pigment masterbatch" denotes a solid dry composition consisting of an intimate mixture of thermoplastic polymer and a single dry pigment. "Prematched pigment masterbatch" denotes a solid dry composition consisting of an intimate mixture of thermoplastic polymer and one or more pigments, the ratio of pigments being varied so that an admixture of the prematched pigment masterbatch and thermoplastic polymer in the desired proportions will produce a product color matched to a desired target. "Toned masterbatch" denotes a solid dry composition consisting of a single pigment masterbatch coated with toning pigments and dispersing agents, the ratio of toning pigments and single pigment masterbatch being varied so that an admixture of the toned masterbatch and thermoplastic polymer in the desired proportions will produce a product color matched to a desired target. A disclosure and description of the properties, preparation, and handling of the masterbatch is disclosed in copending applications, Ser. No. 376,833 of Luftglass and Ser. No. 376,810 of Luftglass and McClary, both filed June 22, 1964; these applications both having the same assignee as the present application. "Rubber masterbatch" denotes an elastomeric composition in a crumbled or powdered form, such as synthetic rubber, e.g., a copolymer of styrene and butadiene; an interpolymer of styrene, butadiene and acrylonitrile; or a copolymer of butadiene and acrylonitrile. The disclosure of the above identified patent applications which is pertinent to the disclosure of this invention is hereby incorporated herein by reference.

According to this invention, it is possible to carry out continuous coloring of thermoplastic polymers in an extruder which is sealed from the surrounding atmosphere. The method of this invention is also suitable for the continuous addition of other materials, for example, rubber and antioxidant, to a sealed system, e.g., rubber masterbatch addition to the polystyrene stream of the extruder to improve the impact of polystyrene.

The method of this invention when applied to thermoplastic polymer coloring techniques comprises passing a toned masterbatch composition along an elongated conduit which has positioned therein a specially adapted ball valve, passing the composition through the valve, and then continuing its passage along the conduit into the devolatilizing section of the extruder. A specific apparatus and method for doing this will be described hereinafter.

For purposes of illustrating the mode of carrying out the invention, the description of the process is directed toward processing of polystyrene. It is understood, however, that the process is suitable for processing any of the thermoplastic polymers disclosed in the above-mentioned applications, e.g., polypropylene and polymethylmethacrylate.

In the polymerization of styrene by the continuous bulk polymerization process, molten polystyrene leaves the last stage of the reactor and enters a devolatilizing extruder at about 400° F. According to this invention, a measured amount of single pigment masterbatch, toned masterbatch or prematched masterbatch is simultaneously introduced into the molten polystyrene stream as the polystyrene passes through the extruder. The polystyrene and the masterbatch are then extruded to form a colored polystyrene product.

A complete description of the continuous bulk polymerization of styrene is found in Chapter 7 of "Styrene, Its Polymers, Copolymers and Derivatives" by Boundy and Boyer, published by Reinhold Publishing Corporation, New York (1952).

Referring now to FIGURE 1, the masterbatch is prepared in 200-pound fiber drums, transferred to the process area, and placed into masterbatch supply tank 1. Polystyrene leaves the last stage of the reactor and passes through conduit 7 and into the extruder 8 via feed hopper 9. Simultaneously, masterbatch is passed from supply tank 1 through conduit 2 into contact with valve 3 having stem 4 connected to variable speed driving means 5. Valve 3, shown in detail in FIGURE 2, measures and transfers masterbatch from a zone in contact with the surrounding atmosphere into a zone in contact with the sealed process system which is maintained under vacuum. The masterbatch then continues downwardly through conduit 6 into extruder 8. In the devolatilizing extruder, polystyrene and masterbatch are mixed in the devolatilization zone 13 to form a product which leaves the extruder in the form of strands through die 16. In a reprocessing or post extruder, the polystyrene and masterbatch are mixed in a decompression zone similar in nature, configuration, and design, to the devolatilization section of the devolatilizing extruder. The masterbatch may be a toned masterbatch for coloring of the polystyrene or it may be rubber masterbatch which upgrades the impact of the polystyrene leaving the reactor or it may be other additives, such as antioxidants.

It is necessary in the devolatilization and extrusion step of the polystyrene process that moisture, air, or other contaminants not be permitted to enter the extruder. Consequently, it is essential that the system remains sealed from the surrounding atmosphere at all times.

The devolatilizing extruder per se, shown in FIGURE 1, is sealed from the atmosphere. Polystyrene from the last stage of the reactor enters the devolatilizing extruder at a temperature of about 400° F. Pressures in the devolatilizing extruder reach pressures in the neighborhood of about 10–300 mm. Hg absolute in the devolatilizing step and about 500 p.s.i. during the extrusion step.

The devolatilizing extruder 8 comprises two parallel screws 10 having a rear portion 11 and a front portion 12; a feed hopper 9; a devolatilizing zone 13; vent opening 15; sight port 14; and a die 16. The screws 10 actually function as two consecutive screws 11 and 12. The first-stage screw 11 feeds the molten polystyrene into the devolatilizing zone 13. The second-stage screws 12 meter the polystyrene through die 16. The polystyrene entering the extruder via conduit 7 contains volatiles, such as unreacted styrene, and may also contain entrapped air and moisture. In the devolatilizing zone, the molten polystyrene is subjected to vacuum and devolatilization. In this zone, the volatiles, entrapped air and moisture are removed via vacuum vent opening 15 while masterbatch is measured and transferred into the molten polystyrene via ball valve 3 through sight port opening 14. The composition consisting of polystyrene and masterbatch are mixed in the devolatilizing zone 13. The composition enters the second-stage screw 12 which pumps the composition through a die 16.

In a reprocessing or post coloring extruder, there is only one screw 10 and the devolatilizing zone is replaced with a decompression zone which, in FIGURE 1, would be represented as 13. The process description is as described above except that there is considerably less unreacted styrene to be removed and the function accomplished in zone 13 is referred to as decompression rather than devolatilization. In either case it is essential to maintain a pressure-tight seal between the zone and the surrounding atmosphere.

The ball valve 3 provides for a permanent sealing of the process system, i.e., devolatilizing extruder, from the surrounding atmosphere, while permitting the addition of masterbatch to the extruder. The ball valve, further, is provided with variable speed driving means which rotates the ball member of the ball valve at a predetermined speed and thereby controls the amount and rate of masterbatch addition to the devolatilizing zone of the extruder.

FIGURE 2 is a detailed drawing of valve 3 shown in FIGURE 1. The valve comprises a valve body 18 in which is located a valve number 19 in the form of a ball. Body cap 21 screws into the lower end of the valve body 18 to hold the ball valve member 19 in place. Lands 22 and 23 formed in body 18 and formed in body cap 21, respectively, are formed to seating rings 24 and 25, which may be made of Teflon, neoprene rubber, Buna N rubber, or natural rubber. The seating rings 24 and 25 are suitably beveled on one face to contact the ball and effect a perfect seal therewith. Seal 26 is a special seal for the body cap. The ball 19 is fitted with a stem 4 which is preferably of square section at its lower end where it fits into a matching square socket provided in the ball. An adapter plate 27 on body 18 surrounds the valve stem. Stem seal 28 seals the stem from body 18. Stem bearing 29 is located in adapter plate 27.

Ball 19 is provided with a cup-shaped chamber 20 which is of a diameter approximately that of conduit 2 and 6.

Slot 30 in stem 4 is specially adapted to receive driving means 5 shown in FIGURE 1. The preferred driving means for rotating the ball is through a chain and sprocket drive having one end thereof connected to a Vickers variable speed transmission and the other end connected to slot 30 of stem 4. The Vickers transmission permits speeds varying from 0 to 1800 r.p.m. (revolutions per minute). The speed is controlled by a hand crank on the side of the transmission. An 8.25 to 1 speed reducer is mounted between the chain and sprocket and the transmission, providing a ball speed of from 0 to 250 r.p.m. The sprocket keyed to the stem in slot 30 rotates the stem through adapter plate 27 and stem bearing 29 (bronze bushing). The rate of masterbatch addition is varied by adjusting the speed output on the Vickers transmission, thereby varying the speed at which the stem and ball rotate.

Another driving means involves the use of a specially adapted Cylrotor. The output shaft and a special adaptor plate of the Cylrotor shaft engages the ball and actuates the valve without any interconnecting linkages. The Cylrotor has an air-operated cylinder with a rack and pinion arrangement to convert the linear motion of the cylinder to a rotary shaft motion. This unit and the valve are connected to an air supply line through a solenoid valve energized by an adjustable reset timer. The rate of masterbatch addition to the extruder is varied by changing the integral between air pulse to the Cylrotor. Each time the cylinder is stroked, the valve turns 180° and returns to its original position.

In addition to the above two drive means, there are other suitable means available, such as, rotary air actuators and electrical operators.

Ball-cup chamber 20 is the means by which the masterbatch is measured and transferred from the atmosphere into the sealed process system. Referring to FIGURE 1, the masterbatch passes from the masterbatch supply tank 1 downwardly through conduit 2 into contact with valve 3.

Figure 3:
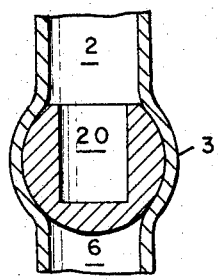
Figure 4:
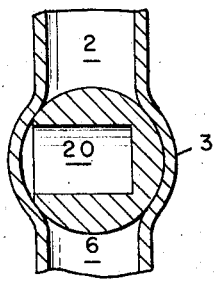
Figure 5:
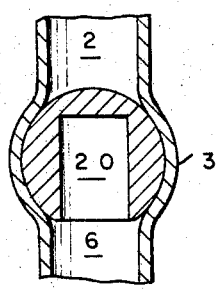
Figure 6:
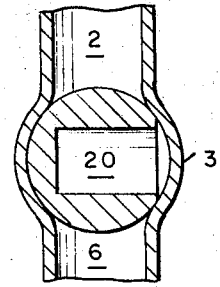

The measuring and transferring of masterbatch from the supply tank 1 into the sealed system can best be illustrated by reference to FIGURES 3 to 6 which show four positions encountered by the ball-cup chamber 20 during one rotation of the ball. Referring now to FIGURE 3 (position 1) ball-cup chamber 20 is open to conduit 2. In this position, masterbatch passing downwardly through conduit 2 charges chamber 20. Chamber 20 in this position is open to the atmosphere and sealed from the process system by means of seats 24 and 25 (shown in FIGURE 2). A driving means, e.g., Vickers transmission, rotates stem 4 clockwise which in turn rotates ball 19 clockwise. After the ball has rotated 90°, chamber 20, charged with masterbatch is sealed from both the atmosphere and the process system, i.e., has passed into a zone which is neither in contact with the atmosphere nor process system, as illustrated in FIGURE 4 (position 2). After the ball has rotated 180°, chamber 20 is open to the process system and sealed from the atmosphere as shown in FIGURE 5 (position 3). In this position, the masterbatch is introduced into the process system, i.e., chamber 20 is now in an inverted position and the masterbatch is discharged from the chamber by gravity into conduit 6. After the ball has rotated 270°, chamber 20 is empty and again sealed from both the atmosphere and process system, as illustrated by FIGURE 6 (position 4). After the ball has rotated 360°, one complete revolution, chamber 20 has resumed its original position (position 1), open to the atmosphere (conduit 2) and sealed from the process system (conduit 6). Chamber 20 is again charged with the masterbatch and the above cycle repeats. It can be seen from FIGURES 3 to 6 that at all times during the operation of the valve, the process system is sealed from the surrounding atmosphere.

The amount of masterbatch added to the extruder may be varied merely by increasing or decreasing the r.p.m. of the ball by correspondingly changing the speed of the driving means. The amount of polystyrene passing through the extruder per unit time can be easily determined by rate checks. If one desires, a gear pump may be included in the outlet of the last stage reactor to permit more accurate metering of the extruder feed and to reduce surging.

The amount and rate of masterbatch addition required to obtain a uniform and homogeneous blend of polystyrene and masterbatch of any given color and opacity is directly proportional to the amount of polystyrene passing through an extruder. In order to obtain a uniform colored product, a masterbatch charge, i.e., the contents from one filling of chamber 20, must be added to devolatilization or decompression zone 13 within a determined time interval, otherwise the strand from the extruder would consist of alternating lengths of colored and uncolored polystyrene. A further consideration is the minimum amount of masterbatch required to produce colored polystyrene product of the desired capacity. For example, to produce 10,000 pounds of an appliance white polystyrene, normally about 400 pounds of masterbatch is required.

Therefore, there are three parameters which must be taken into consideration when determining the r.p.m. of the ball valve: (1) the amount of polystyrene passing through the extruder per unit time; (2) the amount of masterbatch required to color a given amount of polystyrene to the desired color and opacity; and (3) the minimum time interval between charges of masterbatch added to the extruder required to produce a uniformly colored polystyrene product. This minimum time interval that can be tolerated depends in part upon the back mixing in the extruder and the length of extruder available for this mixing.

Number (3) is the minimum time required to complete one revolution of the ball valve, expressed in units of r.p.m.'s of the ball valve. In a given process, the amount of polystyrene passing through the extruder per unit time can be deteremined by rate checks or by use of a positive displacement pump, such as a gear pump, for charging liquid polystyrene to the extruder. Further, the amount of a given masterbatch required to color a given amount of polystyrene will be constant. Therefore, it will only be necessary to determine the revolutions per unit time of the ball valve required to introduce the correct amount of masterbatch into the polystyrene stream of the extruder, i.e., the rate of masterbatch addition. If the rate of addition is grater than the minimum r.p.m. required of the ball valve to produce a uniform color, the ball valve may be operated at the r.p.m. determined for rate of masterbatch addition. If, however, the r.p.m. of the ball valve determined for a given coloring run is less than that required to produce a uniform colored product, it will be necessary to use a ball valve having a smaller chamber, thereby increasing the rate of addition of a masterbatch so as to obtain a product of uniform color.

The following example will illustrate the use of the three parameters.

Given: Ball valve chamber capacity—3 cu. in. (0.1 lb. masterbatch)

Extrudate—20 lbs. per minute 10,000 lbs. of white polystyrene product requires 400 lbs. of masterbatch Determined: Masterbatch addition per minute—0.76 lb.

$$\left(400 \div \frac{10{,}400}{20}\right)$$

R.p.m. of ball valve—7.6 (0.76÷0.1)

Minimum r.p.m. required of ball valve to yield a product of uniform color—1.5

The ball chamber therefore can be rotated at a rate of 7.6 r.p.m., since this is larger than the minimum 1.5 r.p.m. required to produce a product of uniform color.

It is now possible by employing the method of this invention to obtain a thermoplastic polymer product of uniform color. The method of this invention also has advantages in that (1) cleanup problems are reduced to a minimum, since cleanup between colors merely consists of blowing out the valve and normal extruder cleanup and (2) the process in continuous, each drum of masterbatch being prepared, color checked and approved by the laboratory, thus, eliminating lost time and product wastes for color checks and adjustments in production.

While the above description is directed toward measuring and transferring masterbatch into the devolatilizing extruder of a polystyrene process, it is also applicable for the continuous addition of other solid materials to a sealed system.

I claim as my invention:

1. In the manufacture of thermoplastic polymers, a method of measuring and transferring a masterbatch composition from an atmospheric zone into an always sealed process zone which comprises the steps of
   (a) feeding said masterbatch downwardly through a vertically extended conduit having an upper and lower portion separated by a ball-shaped valve member having a housing into a chamber of said ball-shaped valve member,
   (b) continually rotating said ball-shaped valve member at a r.p.m. at least great enough to produce a product containing uniform dispersion of said masterbatch, said rotation being first through 180° thereby discharging said masterbatch from said chamber into said lower portion of said conduit and then through another 180° wherein said chamber is again in contact with said upper portion of said conduit and is again charged with masterbatch, said rotation of said ball-shaped valve member including passing said composition through a zone which is out of contact with said atmospheric zone and said process zone, and
   (c) passing said masterbatch downwardly through said lower portion of said conduit into the molten thermoplastic polymer stream contained in the extruder of said process.

2. A process according to claim 1 wherein the masterbatch composition is a toned masterbatch composition and the thermoplastic polymer is selected from the group consisting of polystyrene, polypropylene and polymethylmethacrylate.

3. A process according to claim 1 wherein the masterbatch is a rubber masterbatch and the thermoplastic polymer is polystyrene, said masterbatch thereby improving the impact of the polystyrene.

References Cited

UNITED STATES PATENTS

| | | | |
|---|---|---|---|
| 740,699 | 10/1903 | Schrader | 222—139 |
| 1,226,108 | 5/1917 | Olney | 222—57 |
| 2,540,146 | 2/1951 | Stober | 264—40 |
| 3,155,750 | 11/1964 | Dahn et al. | 264—40 |
| 3,228,065 | 1/1966 | Cournoyer et al. | 222—57 |
| 3,287,477 | 11/1966 | Vesilind | 264—176 |

OTHER REFERENCES

Boundy, Ray H. ed. Styrene its polymers, copolymers and derivatives. New York, Reinhold, 1952, pp. 1226–1228. (American Chemical Society Monograph Series).

ALEXANDER H. BRODMERKEL, *Primary Examiner.*

P. E. ANDERSON, *Assistant Examiner.*